United States Patent
Darrow, Jr. et al.

(10) Patent No.: US 7,607,607 B2
(45) Date of Patent: Oct. 27, 2009

(54) DE-ROTATION SYSTEM SUITABLE FOR USE WITH A SHAFT FAIRING SYSTEM

(75) Inventors: David A. Darrow, Jr., Stratford, CT (US); Frank P. D'Anna, Seymour, CT (US); Thomas L. Sbabo, Hamden, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 161 days.

(21) Appl. No.: 12/108,488

(22) Filed: Apr. 23, 2008

(65) Prior Publication Data

US 2009/0084891 A1    Apr. 2, 2009

Related U.S. Application Data (63) Continuation-in-part of application No. 11/432,875, filed on May 12, 2006.

(60) Provisional application No. 60/693,592, filed on Jun. 24, 2005, provisional application No. 60/684,694, filed on May 26, 2005, provisional application No. 60/776,278, filed on Feb. 23, 2006.

(51) Int. Cl.
   *B64C 27/00* (2006.01)

(52) U.S. Cl. .............. 244/17.19; 244/17.23; 244/17.27; 244/130; 416/33; 416/41; 416/124; 416/179; 416/244 R; 114/243

(58) Field of Classification Search .............. 244/17.19, 244/17.23, 17.27, 130; 416/33, 41, 124, 416/179, 244 R; 114/243
See application file for complete search history.

(56) References Cited

U.S. PATENT DOCUMENTS

| 2,323,786 | A | 7/1943 | Beisel |
| 2,328,786 | A | 9/1943 | Crowder |
| 2,397,632 | A | 4/1946 | Stuart |
| 3,149,803 | A | 9/1964 | Petrides et al. |
| 3,894,703 | A | 7/1975 | Velasquez |
| 4,022,546 | A | 5/1977 | Drees et al. |
| 4,053,258 | A | 10/1977 | Mouille |
| 4,123,018 | A | 10/1978 | Tassin de Montaigu |
| 4,212,588 | A | 7/1980 | Fradenburgh |
| 4,478,379 | A | 10/1984 | Kerr |
| 4,566,856 | A | 1/1986 | Miller |
| 4,580,944 | A | 4/1986 | Miller |
| 4,809,931 | A | 3/1989 | Mouille et al. |
| 5,251,847 | A | 10/1993 | Guimbal |
| 5,289,994 | A | 3/1994 | Del Campo Aguilera |
| 5,364,230 | A | 11/1994 | Krauss et al. |

(Continued)

OTHER PUBLICATIONS

Title: Summary of Rotor Hub Drag Data; By: G.N. Keys and H.J. Rosenstein; Dated: Mar. 1978.

(Continued)

*Primary Examiner*—J. Woodrow Eldred
(74) *Attorney, Agent, or Firm*—Carlson, Gaskey & Olds PC (57) ABSTRACT

A de-rotation system includes a first ring gear defined about an axis of rotation, a second ring gear defined about the axis of rotation and a gear set in meshing engagement with the first ring gear and the second ring gear to control a position of a housing about the axis of rotation.

20 Claims, 9 Drawing Sheets

U.S. PATENT DOCUMENTS

| | | |
|---|---|---|
| 5,415,364 A | 5/1995 | Grant |
| 5,588,618 A | 12/1996 | Marze et al. |
| 5,727,754 A | 3/1998 | Carter, Jr. |
| 5,885,059 A | 3/1999 | Kovalsky et al. |
| 5,954,480 A | 9/1999 | Schmaling et al. |
| 6,189,475 B1 | 2/2001 | Coakley |
| 7,083,142 B2 | 8/2006 | Scott |
| 7,229,251 B2 | 6/2007 | Bertolotti et al. |
| 7,270,520 B2 | 9/2007 | Sudre et al. |
| 2005/0254903 A1 | 11/2005 | Mc Millan et al. |
| 2007/0215028 A1* | 9/2007 | Lie .......................... 114/243 |

OTHER PUBLICATIONS

Title: Experimental Investigation of Advanced Hub and Pylon Fairing Configurations to Reduce Helicopter Drag; By: D.M. Martin, R.W. Mort, L.A. Young, P.K. Squires; Dated: Sep. 1993, NASA Technical Memorandum 4540.

Title: The First 50 Years Were Fine . . . But What Should We Do for an Encore?—The 1994 Alexander A. Nikolsky Lecture; By: Evan A. Fradenburgh; Journal of the American Helicopter Society; Jan. 1995.

Title: Rotorcraft Hub Shroud; By: LTC Chip Lunn; Brannon Industries; Apr. 11, 2006.

PCT International Search Report and written opinion mailed Aug. 19, 2008 for PCT/US06/20349.

* cited by examiner

FIG.5E ly aspect of the present invention includes: a first ring gear
DE-ROTATION SYSTEM SUITABLE FOR USE WITH A SHAFT FAIRING SYSTEM The present application is a Continuation-In-Part of U.S. patent application Ser. No. 11/432,875, filed May 12, 2006, which claims priority to U.S. Provisional Patent Application Nos. 60/693,592, filed Jun. 24, 2005; 60/684,694, filed May 26, 2005; and 60/776,278, filed Feb. 23, 2006.

BACKGROUND

The present invention is directed to a de-rotation system that stabilizes a shaft fairing mounted between an upper hub fairing and a lower hub fairing.

Typically, the aerodynamic drag associated with a rotor hub on a rotary wing aircraft is a significant portion of the overall aircraft drag, typically 25% to 30% for conventional single-rotor helicopters. The rotor system drag increases for a rotary wing aircraft having a counter-rotating, coaxial rotor system primarily due to the dual rotor hubs and the interconnecting shaft therebetween. For high-speed rotary wing aircraft, the increased drag resulting from the counter-rotating, coaxial rotor system may result in a relatively significant power penalty.

The aerodynamic drag of the dual counter-rotating, coaxial rotor system is generated by three main components—the upper rotor hub assembly, the lower rotor hub assembly, and the interconnecting main rotor shaft assembly. The drag contribution may be approximately 40% for each of the hubs, and 20% for the interconnecting main rotor shaft assembly. Typically, a rotor hub fairing arrangement is mounted to each of the upper rotor hub and the lower rotor hub such that overall drag on the rotorcraft is reduced. The interconnecting main rotor shaft between the upper rotor hub assembly and the lower rotor hub assembly, however, is typically exposed.

For a variety of reasons including, but not limited to, reduced drag and low observability, shaft fairings have been developed to cover the exposed interconnecting main rotor shaft. The shaft fairing is mounted to the counter-rotating, coaxial rotor system within a rotational environment between the upper hub fairing and the lower hub fairing through a bearing arrangement.

During some flight conditions, the shaft fairing may undesirably rotate relative the airframe which may increase drag and reduce the low-observability benefits of the shaft fairing.

SUMMARY

A de-rotation system for a fairing according to an exemplary aspect of the present invention includes: a first ring gear rotatable about a rotor axis of rotation; a second ring gear rotatable about the rotor axis of rotation; a gear set in meshing engagement with the first ring gear and the second ring gear; a housing which supports the gear set, the gear set operable to control a position of the housing about the rotor axis of rotation; and a shaft fairing mounted to the housing for rotation about the rotor axis of rotation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE EXEMPLARY EMBODIMENTS

Figure 1A:
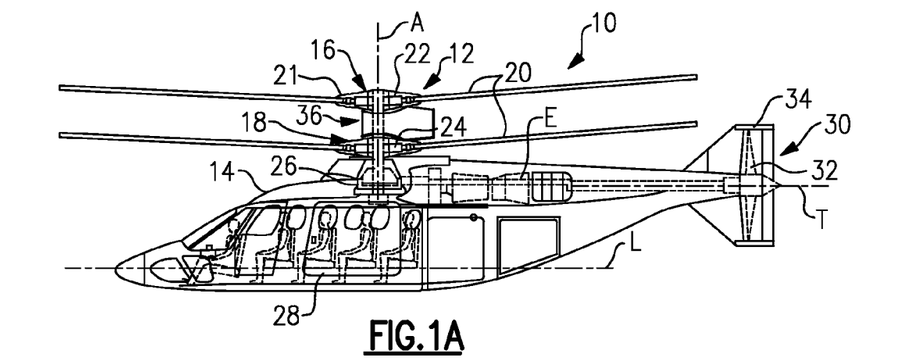
FIG. 1A is a general schematic view of an exemplary rotary wing aircraft embodiment for use with the present invention.
Figure 1B:
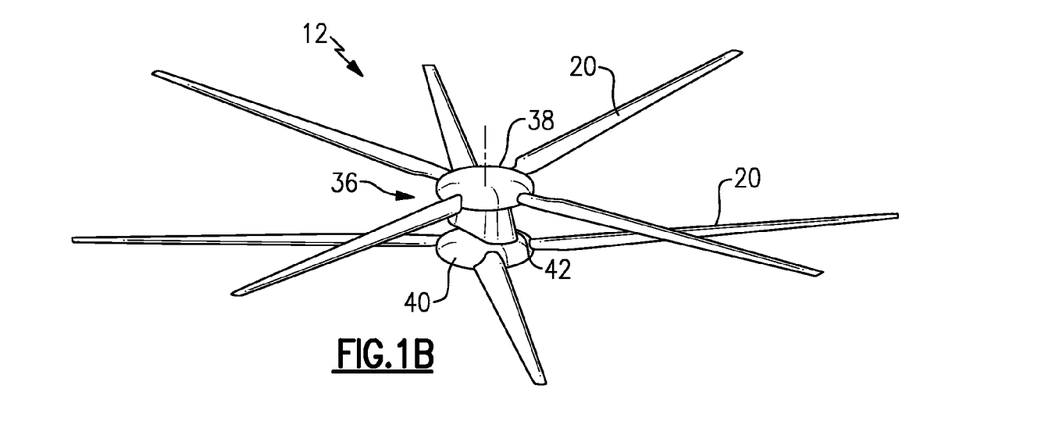
FIG. 1B is general perspective view of a counter-rotating coaxial rotor system mounting a rotor hub fairing system.

FIG. 1A illustrates an exemplary vertical takeoff and landing (VTOL) rotary-wing aircraft 10 having a dual, counter-rotating, coaxial rotor system 12 which rotates about an axis of rotation A. FIG. 1B is general perspective of the counter-rotating coaxial rotor system 12 mounting a rotor hub fairing system 36. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in the disclosed embodiment, other counter-rotating, coaxial rotor systems will also benefit from the present invention.

The dual, counter-rotating, coaxial rotor system 12 includes an upper rotor system 16 and a lower rotor system 18. Each rotor system 16, 18 includes a plurality of rotor blades 20 mounted to a rotor hub 22, 24 for rotation about the axis of rotation A. A plurality of the main rotor blades 20 project substantially radially outward from the hub assemblies 22, 24. Any number of blades 20 may be used with the rotor system 12.

A main gearbox 26 which may be located above the aircraft cabin 28 drives the rotor system 12. The translational thrust system 30 may be driven by the same main gearbox 26 which drives the rotor system 12. The main gearbox 26 is driven by one or more engines (illustrated schematically at E). The gearbox 26 may be interposed between the gas turbine engines E, the rotor system 12 and the translational thrust system 30.

The translational thrust system 30 may be mounted to the rear of the airframe 14 with a rotational axis T oriented substantially horizontal and parallel to the aircraft longitudinal axis L to provide thrust for high-speed flight. The translational thrust system 30 in the illustrated non-limiting embodiment of FIG. 1A includes a pusher propeller 32 mounted within an aerodynamic cowling 34. Although a tail mounted translational thrust system 30 is disclosed in this illustrated non-limiting embodiment of FIG. 1A, it should be understood that any such system or other translational thrust systems, including tractor and pod mounted systems, may alternatively or additionally be utilized.

The rotor system 12 includes a rotor hub fairing system 36 generally located between and around the upper and lower rotor systems 16, 18 such that the rotor hubs 22, 24 are at least partially contained therein. The rotor hub fairing system 36 provides significant drag reduction with which large-scale flow separation is greatly reduced.

The rotor hub fairing system 36 generally includes an upper hub fairing 38, a lower hub fairing 40 and a shaft fairing 42 therebetween (also illustrated in FIG. 1B). The rotor hub fairing system 36 is integrated such that the shaft fairing 42 generally follows the contours of the upper hub fairing 38 and the lower hub fairing 40 at the rotational interfaces therebetween to reduce interference effects between the separate fairings 38, 40, 42 and minimize flow separation in the junction areas. Furthermore, the lower hub fairing 40 is integrated with the airframe 14 in an area typically referred to on a rotorcraft as a pylon 14D (see FIG. 1C). It should be understood that fairing systems of various configurations will be usable with the present invention.

Figure 1C:
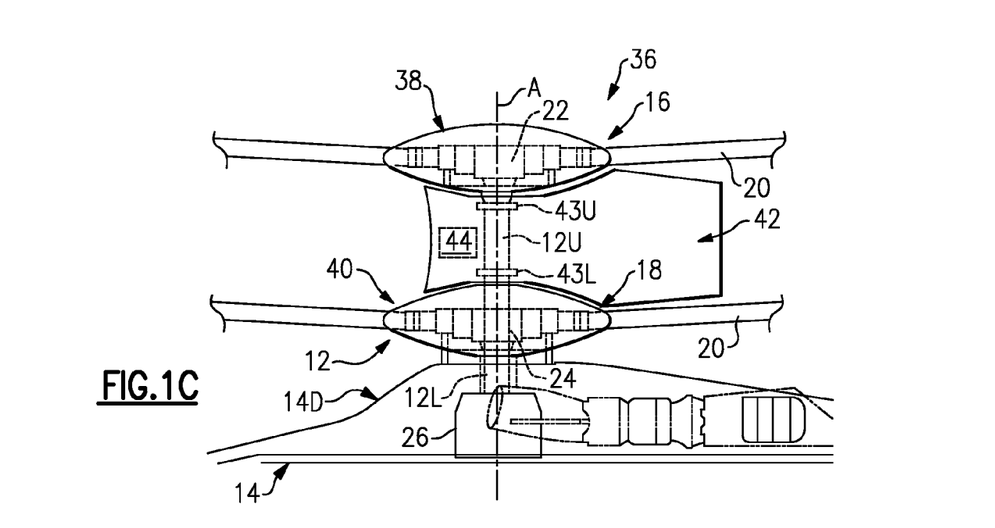
FIG. 1C is an expanded partial phantom view of a counter-rotating coaxial rotor system mounting a rotor hub fairing system according to one non-limiting embodiment of the present invention.

Referring to FIG. 1C, the shaft fairing 42 may be mounted to the counter-rotating, coaxial rotor system 12 through a bearing arrangement 43U, 43L (illustrated schematically) such that the shaft fairing 42 may be positioned at a relative azimuthal position about the axis of rotation A relative the airframe 14 by a de-rotation system 44. The upper bearing arrangement 43U and the lower bearing arrangement 43L may be respectively located adjacent an upper portion and a lower portion of the shaft fairing 42. The upper bearing arrangement 43U may be attached to one rotor shaft 12U, here the inner main rotor shaft 12U which drives the upper rotor hub 22, while the lower bearing arrangement 43L is attached to the other rotor shaft 12L, here the outer main rotor shaft 12L which drives the lower rotor hub 24, such that the bearing arrangement 43U, 43L are counter rotating and the net bearing drag is relatively low. It should be understood that other shaft arrangements may also be utilized herewith.

The de-rotation system 44 controls the position of the shaft fairing 42 about the axis of rotation A such that the shaft fairing 42 remains in an essentially fixed azimuthal position relative the airframe 14 irrespective of the flight regime and irrespective of potential unequal parasitic friction of the bearing arrangement 43U, 43L. Although the present invention is described in connection with a particular aircraft embodiment, it should be readily appreciated that other areas which require an azimuthally stationary fairing in a rotational environment will also benefit herefrom.

Figure 2A:
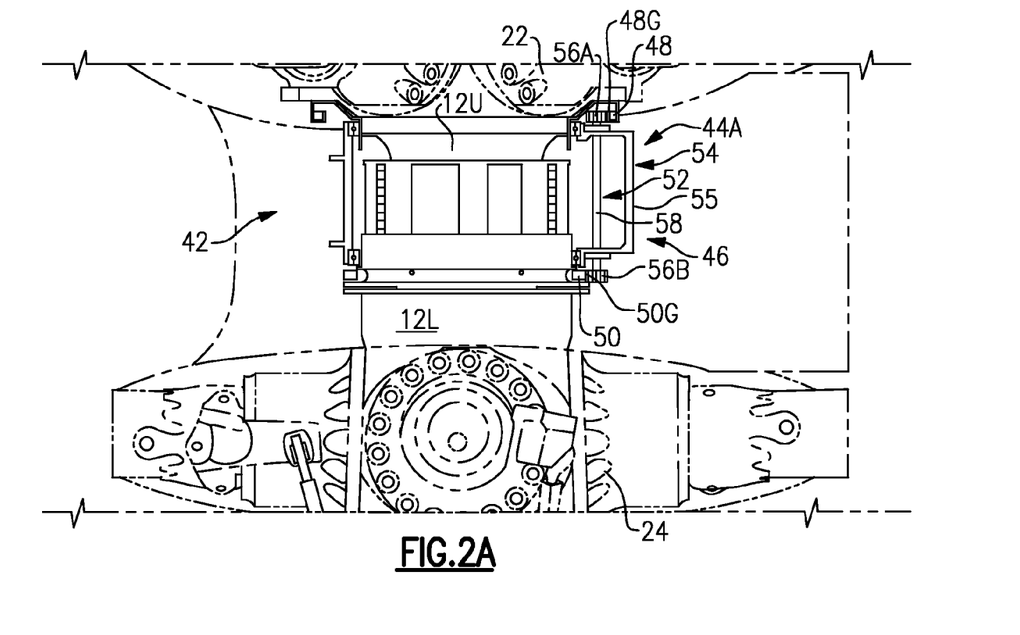
FIG. 2A is a perspective partial phantom view of a counter-rotating coaxial rotor system illustrating a de-rotation system contained within a shaft fairing.
Figure 2B:
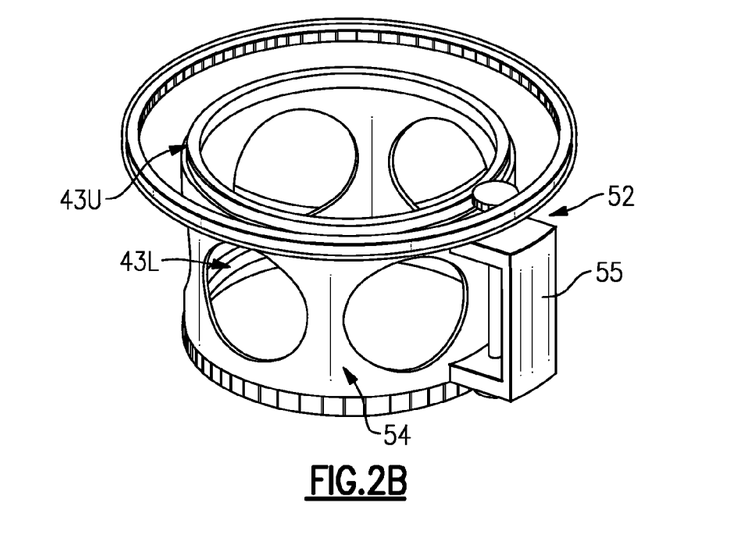
FIG. 2B is an expanded view of the de-rotation system illustrated in FIG. 2A.

Referring to FIG. 2A, the de-rotation system 44A includes a gear system 46. The gear system 46 generally includes a first ring gear 48, a second ring gear 50, a gear set 52, and a housing 54. The first ring gear 48 is mounted for rotation with the inner main rotor shaft 12U and the second ring gear 50 is mounted for rotation with the outer main rotor shaft 12L (also illustrated in FIG. 2B). The first ring gear 48 includes an inner diameter gear 48G while the second ring gear 50 includes an outer diameter gear 50G.

The housing 54 may be defined about axis A and surround the outer main rotor shaft 12L. The housing may further be assembled from a multiple of sections to facilitate maintenance or such like. The housing 54 is mounted to the shaft fairing 42 and the main rotor system 12 through the bearing arrangement 43U, 43L (also illustrated in FIG. 2C) such that the shaft fairing 42 rotates with the housing 54 about the axis of rotation A. The upper bearing arrangement 43U and the lower bearing arrangement 43L maybe respectively located adjacent an upper portion and a lower portion of the housing 54. The upper bearing arrangement 43U is attached to one rotor shaft 12U while the lower housing bearing 43L is attached to the other rotor shaft 12L such that the bearings counter rotate and the net bearing drag is relatively low.

The housing 54 includes a fitting 55 that supports the gear set 52. The gear set 52 includes an upper pinion gear 56A, a lower pinion gear 56B and a shaft 58 that rotationally connects the upper pinion gear 56A and the lower pinion gear 56B. The upper pinion gear 56A is in meshing engagement with the inner diameter gear 48G of the first ring gear 48 and the lower pinion gear 56B is in meshing engagement with the outer diameter gear 50G of the second ring gear 50.

Figure 2C:
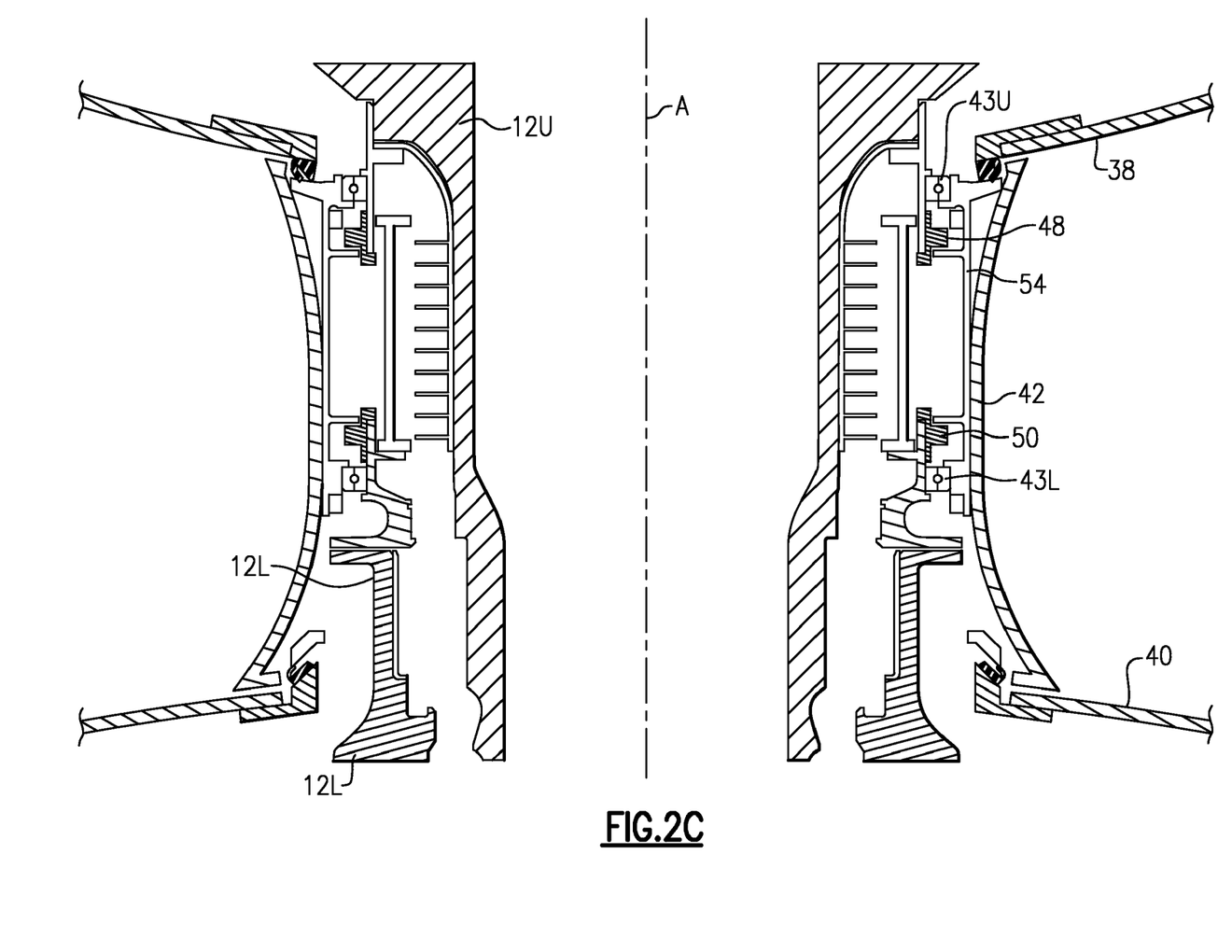
FIG. 2C is a frontal view of the de-rotation system of FIG. 2A taken through the rotor system axis of rotation.

The gear set 52 may be located in a forward section of the fairing 42 such that the de-rotation system 44A readily accommodates shaft fairing geometries that exhibit a "necking", or "hour-glass" shape (FIG. 2C). That is, the de-rotation system 44A is accomplished with a low profile housing 54, relatively few parts and few gear meshes to facilitate the "necking", or "hour-glass" fairing shape.

In operation, the first ring gear 48 rotates with the inner main rotor shaft 12U in a first direction and the second ring gear 50 rotates with the outer main rotor shaft 12L in an opposite direction to drive respective pinion gears 56A, 56B. The pinion gears 56A, 56B rotate in the same direction due to the inner diameter gear 48G of the first ring gear 48 and the outer diameter gear 50G of the second ring gear 50. Rotation of the pinion gear set 52 maintains the housing 54 and thus the shaft fairing 42 in a stable rotational position relative the airframe 14.

Figure 3:
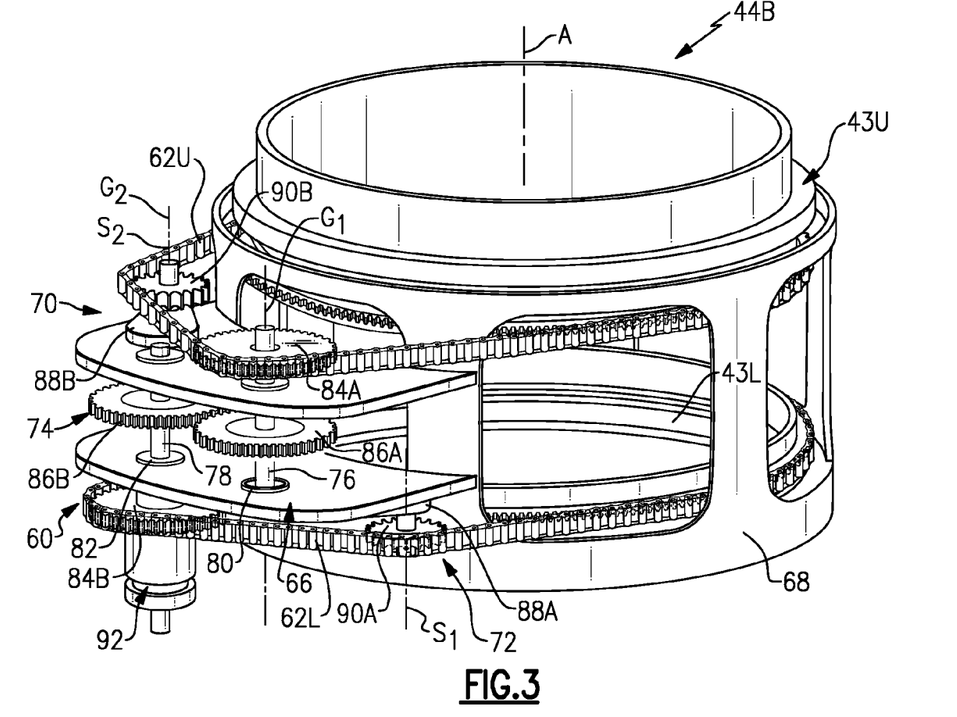
FIG. 3 is a perspective view of another de-rotation system according to another non-limiting embodiment.

Referring to FIG. 3, another non-limiting embodiment of a de-rotation system 44B includes a gear set 60 to control the position of the shaft fairing 42 about the axis of rotation A such that the shaft fairing 42 remains in an essentially fixed azimuthal position relative the airframe 14 irrespective of the flight regimes and irrespective of potential unequal parasitic friction of the bearing arrangement 43U, 43L.

A first chain 62U and a second chain 62L are driven in equal but opposite directions about the axis of rotation A. The first chain 62U rotates with the rotor shaft 12U as the first chain 62U is in engagement with a first ring gear 64U fixed for rotation with rotor shaft 12U. The second chain 62L rotates with the rotor shaft 12L as the second chain 62L is in engagement with a second ring gear 64L fixed for rotation with rotor shaft 12L. It should be understood that the although the term "chain" is utilized herein, other members such as toothed belts, flex gears and the such like may also be utilized.

The gear set 60 is mounted within a fitting 66 of a housing 68, similar to what was described above for fitting 55 and housing 54. The housing 68 is mounted to the shaft fairing 42 and the main rotor system 12 through the bearing arrangement 43U, 43L such that the housing 50 rotates with the shaft fairing 42 about the axis of rotation A. The upper bearing arrangement 43U is attached to one rotor shaft 12U while the lower housing bearing 43L is attached to the other rotor shaft 12L such that the bearings counter-rotate and the net bearing drag is relatively low.

The gear set 60 generally includes an upper gear set 70 driven through the first chain 62U, a lower gear set 72 driven through the second chain 62L and an idler gear set 74 therebetween. The gear set 60 further includes a first shaft 76 which rotates about a first axis of rotation G1 and a second shaft 78 which rotates about a second axis of rotation G2. The shafts may be supported upon respective shaft bearing arrangements 80, 82 which are mounted to the fitting 66.

Shaft 76 supports a driven gear 84A and an idler gear 86A. A sprocket arm 88A is mounted to the fitting 66 to support an idler sprocket 90A which rotates about sprocket axis S1. The sprocket arm 88A facilitates an adjustable displacement between axis G1 sprocket axis S1. The sprocket arm 88A may be manually adjustable to control a tension within the first chain 62U. Alternatively, or in addition thereto, the sprocket arm 88A may be spring biased to control the tension. Shaft 78 supports a driven gear 84B and an idler gear 86B. A sprocket arm 88B is mounted to the fitting 66 to support an idler sprocket 90B which rotates about sprocket axis S2. The sprocket arm 88B facilitates adjustable displacement between axis G2 and sprocket axis S2, similar to what was described above for the axis G1 and sprocket axis S1.

The first chain 62U is engaged with the driven gear 84A and the idler sprocket 90B. The second chain 62L is engaged with the driven gear 84B and the idler sprocket 90A. That is, the shafts 76, 78 support the gears in essentially reverse order along their respective axes G1, G2. The first chain 62U is in engagement with the respective driven gear 84A and idler sprocket 90B while the second chain 62L is in engagement with the respective driven gear 84B and idler sprocket 90A. The idler gears 86A, 86B are in direct meshed engagement with each other to control the azimuthal position of the housing 68 and the mounted shaft fairing 42. One of the shafts 76, 78 and associated driven gear 84A, 84B—here illustrated as shaft 78 and driven gear 84B—may further include a clutch system 92 which selectively disengages the de-rotation system 44B such that the shaft fairing 42 is free to rotate with, for example, the relative wind. In other words, the driven gear 84B is not driven due to the clutch system 92. Driven gear 84B no longer drives driven idler gear 86B such that the idler gear set 74 essentially freewheels and the shaft fairing 42 is thereby no longer driven such that the azimuthal position of the housing 68 and the mounted shaft fairing 42 is no longer controlled. This essentially allows the shaft fairing 42 to be free to rotate about the axis of rotation A, with, for example, the relative wind.

In operation, the first ring gear 64U rotates with the inner main rotor shaft 12U in a first direction and the second ring gear 64L rotates with the outer main rotor shaft 12L in a direction opposite the first direction to drive respective chains 62U, 62L. The first chain 62U drives the driven gear 84A and the idler sprocket 90B while the second chain 62L drives the driven gear 84B and the idler sprocket 90A while the idler gears 86A, 86B are in direct meshed engagement with each other to maintain the fitting 66 of the housing 68 and thus the shaft fairing 42 in a stable rotational position relative the airframe 14.

Figure 4:
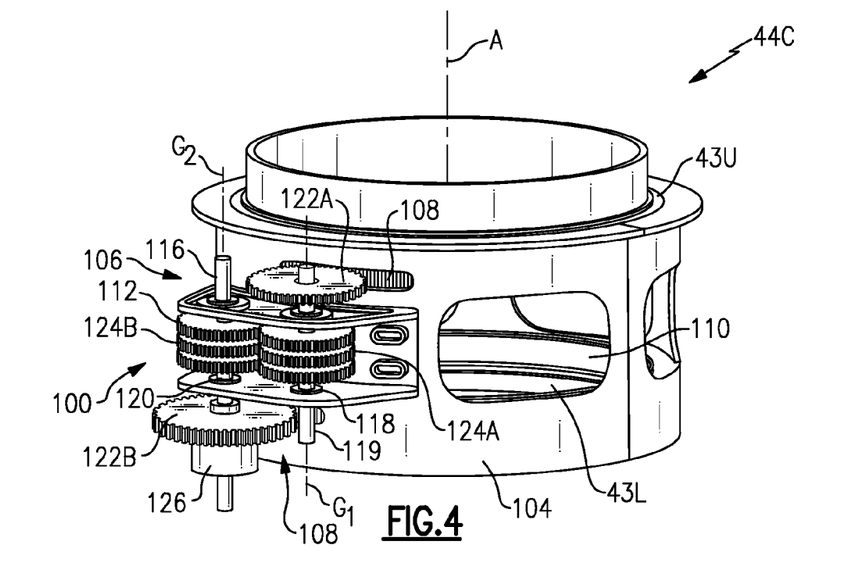
FIG. 4 is a schematic view of another de-rotation system according to another non-limiting embodiment.
Figure 5A:
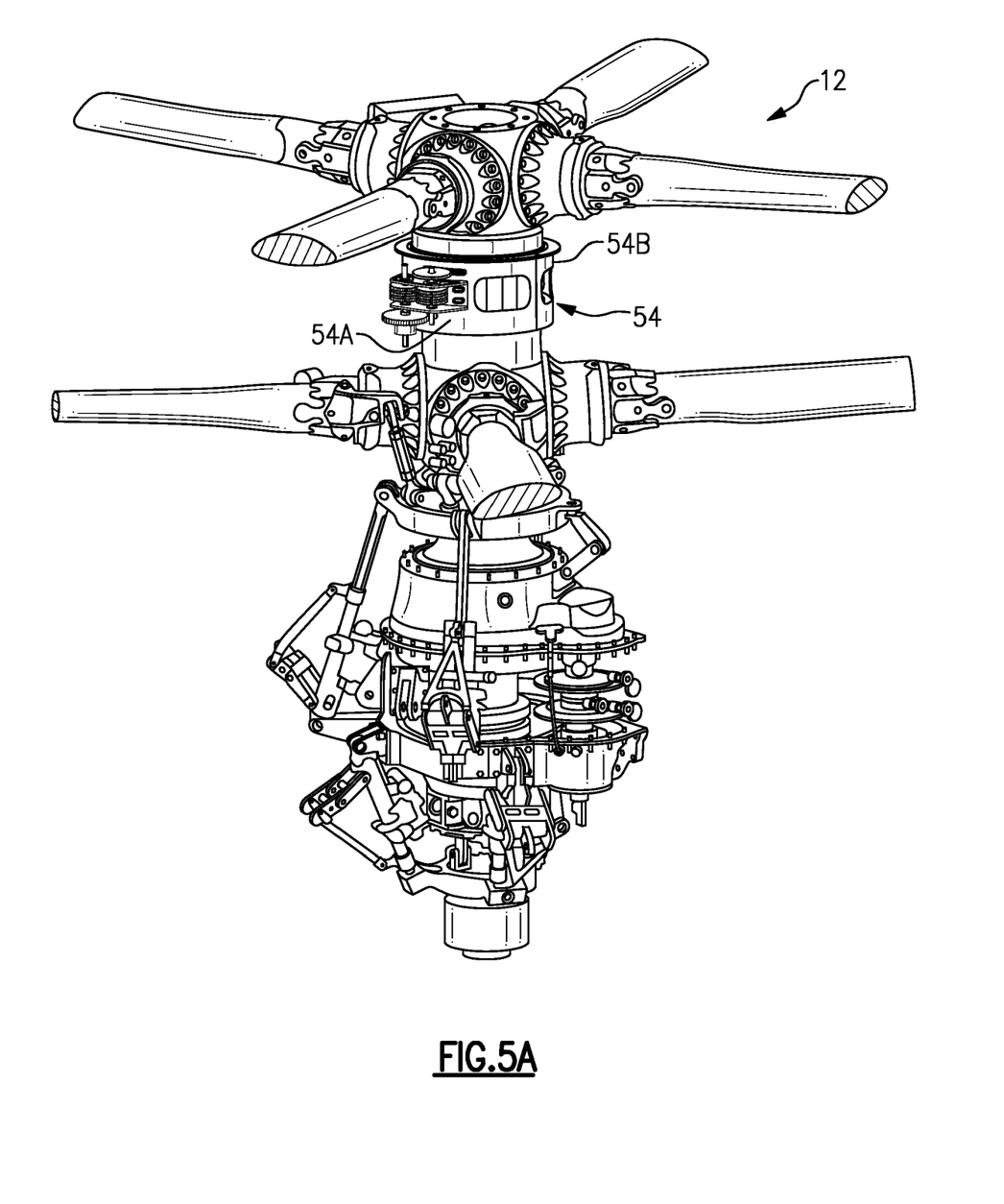
FIG. 5A is a perspective view of a rotor system for use with a de-rotation system mounted between an upper rotor system and a lower rotor system.
Figure 5B:
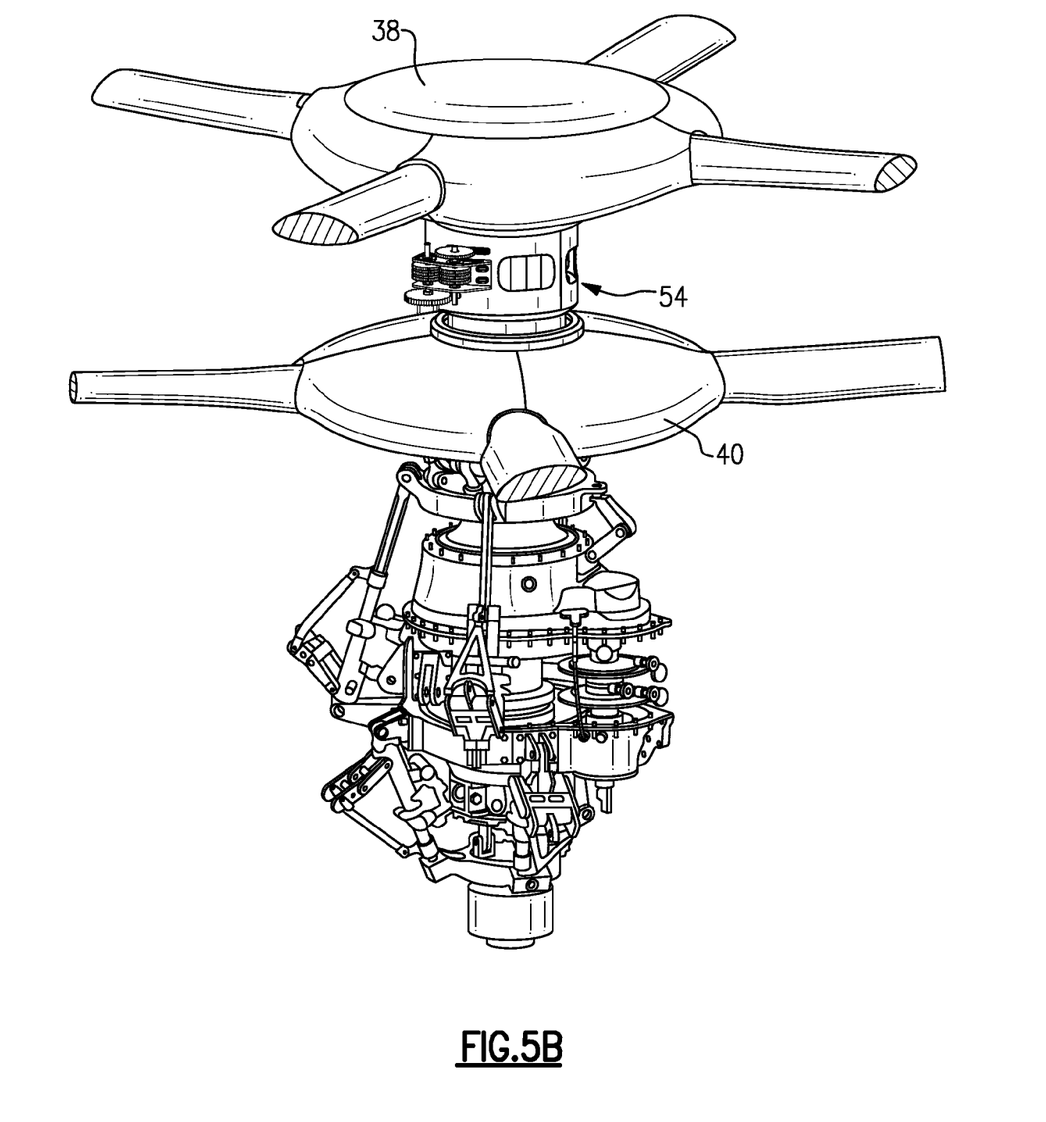
FIG. 5B is a perspective view of the rotor system with an upper hub fairing and a lower hub fairing mounted thereto.
Figure 5C:
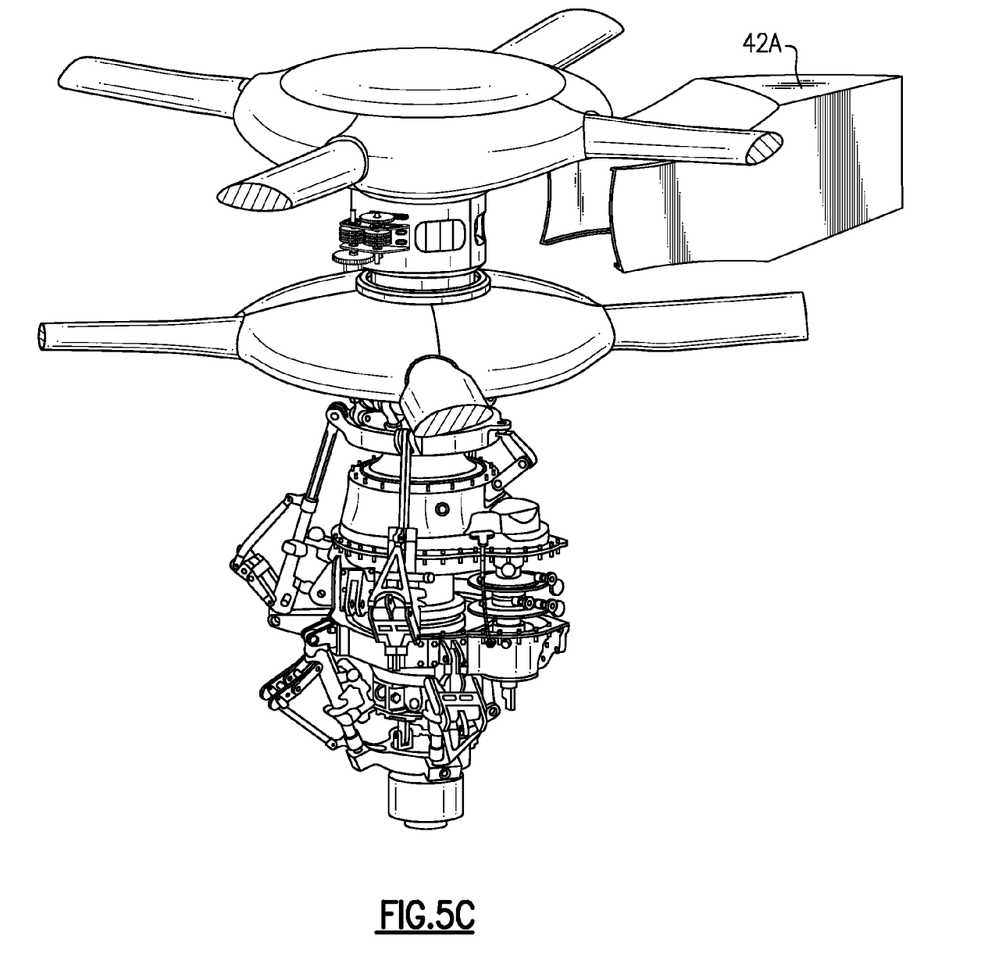
FIG. 5C is an exploded view of the rotor system with a trailing edge portion of a shaft fairing prior to assembly.
Figure 5D:
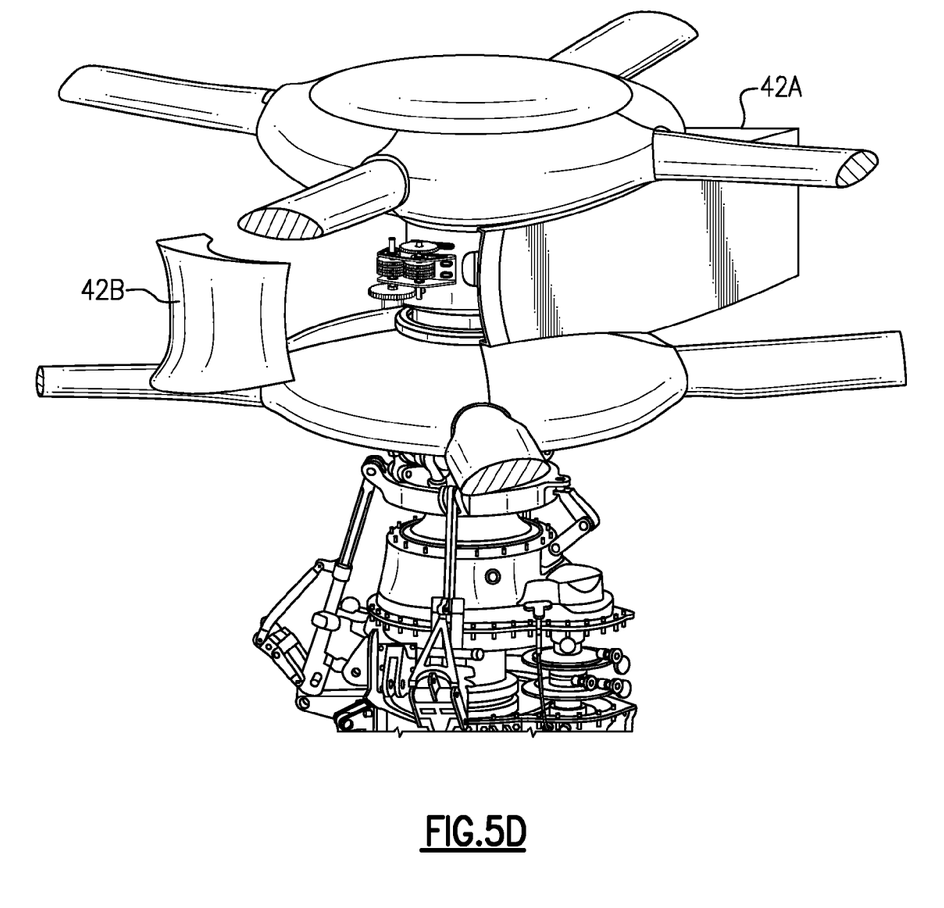
FIG. 5D is an exploded view of the rotor system with the trailing edge portion of the shaft fairing positioned for receipt of a leading edge portion of the shaft fairing.
Figure 5E:
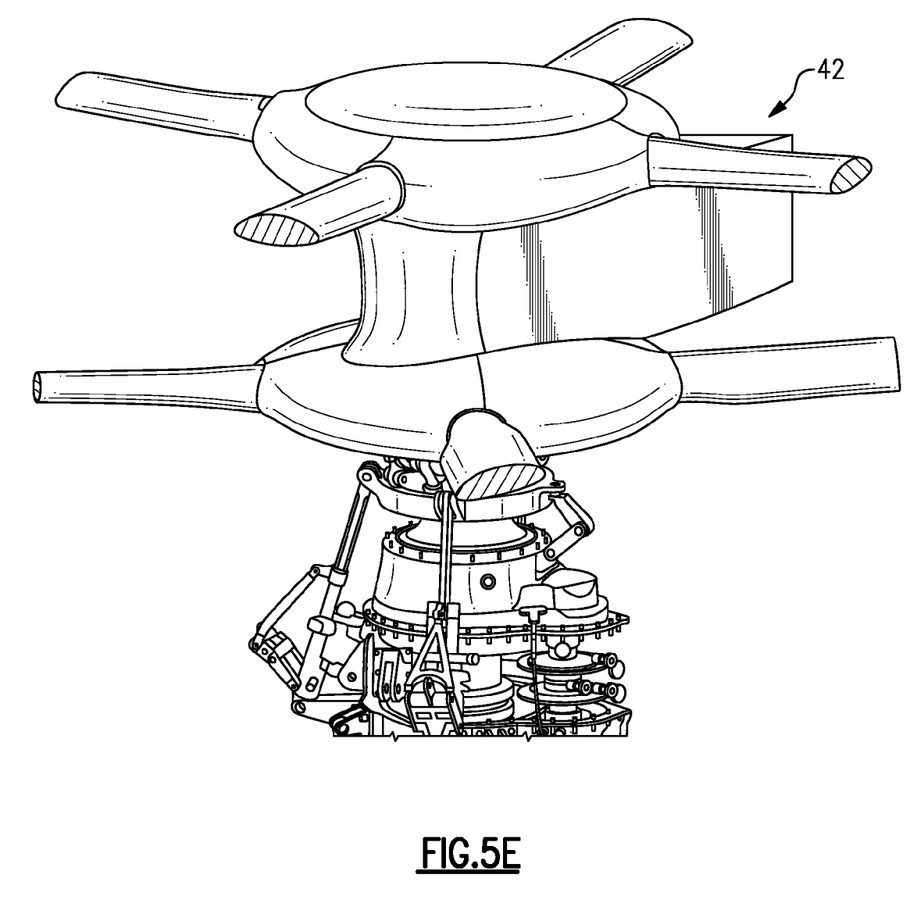
FIG. 5E is a perspective view of the rotor system with the rotor hub fairing system mounted thereto.

Referring to FIG. 4, another non-limiting embodiment of a de-rotation system 44C includes a gear set 100 to control the position of the shaft fairing 42 about the axis of rotation A such that the shaft fairing 42 remains in an essentially fixed azimuthal position relative the airframe 14 irrespective of the flight regimes and irrespective of potential unequal parasitic friction of the bearing arrangement 43U, 43L.

The gear set 100 is mounted within a fitting 102 of a housing 104, which(?) is mounted to the shaft fairing 42 or the main rotor system 12 (FIGS. 5A-5E). The gear set 100 generally includes an upper gear set 106U driven by the first ring gear 108, a lower gear set 106L driven through the second ring gear 110 and an idler gear set 112 therebetween. The first ring gear 108 is fixed for rotation with rotor shaft 12U and the second ring gear 110 is fixed for rotation with rotor shaft 12L. The gear set 100 further includes a first shaft 114 which rotates about a first axis of rotation G1 and a second shaft 116 which rotates about a second axis of rotation G2. The shafts 114, 116 may be supported upon respective shaft bearing arrangements 118, 120 which are mounted within the fitting 102.

Shaft 114 supports a driven gear 122A and an idler gear set 124A while shaft 116 supports a driven gear 122B and an idler gear set 124B. The idler gear sets 124A, 124B may be manufactured of a non-metallic material and may be a set that includes a multiple of gears to accommodate the torque between shafts 114, 116.

The first ring gear 108 is in meshed engagement with the driven gear 122A and the second ring gear 110 is in meshed engagement with the driven gear 122B. The idler gears 124A, 124B are in direct meshed engagement with each other to control the position of the housing 104 and the mounted shaft fairing 42. One of the shafts 114, 116 and associated driven gear 122A, 122B—here illustrated as shaft 114—may further include a clutch system 126 which selectively disengages the de-rotation system 44B.

In operation, the first ring gear 108 rotates with the inner main rotor shaft 12U in a first direction and the second ring gear 110 rotates with the outer main rotor shaft 12L in an opposite direction to drive the respective driven gears 122A, 122B and shafts 114, 116. The shafts 114, 116 counter-rotate in response to the idler gear sets 124A, 124B being in meshed engagement to maintain the housing 104 and thus the shaft fairing 42 in a stable azimuthal position relative the airframe 14.

The de-rotation system 44A-44C is a passive system within which derives its mechanical input from the main rotor system 12. The power required is minimal as friction is the only opposing force and gear meshes are noted as efficient power transfer mechanisms. Since matching rotational speed is satisfied by the gear geometry reduction ratio, the de-rotation system 44A will maintain a stable azimuthal position alignment, regardless of main rotor RPM variations.

It should be understood that relative positional terms such as "forward," "aft," "upper," "lower," "above," "below," and the like are with reference to an illustrated attitude of the structure and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A de-rotation system for a fairing comprising:
   a first ring gear rotatable about a rotor axis of rotation;
   a second ring gear rotatable about said rotor axis of rotation;
   a gear set in meshing engagement with said first ring gear and said second ring gear;
   a housing which supports said gear set, said gear set operable to control a position of said housing about said rotor axis of rotation; and a shaft fairing mounted to said housing for rotation about said rotor axis of rotation.

2. The system as recited in claim 1, wherein said gear set is operable to control an azimuthal position of said housing such that said fairing remains in an approximately fixed azimuthal position.

3. The system as recited in claim 1, wherein said shaft fairing is airfoil shaped.

4. The system as recited in claim 1, wherein said first ring gear and said second ring counter-rotate.

5. The system as recited in claim 1, wherein said gear set comprises a first pinion in meshing engagement with an inner diameter of said first ring gear and a second pinion in meshing engagement with an outer diameter of said second ring gear, said first pinion gear rotationally mounted to said second pinion gear through a pinion shaft.

6. The system as recited in claim 1, wherein said gear set comprises a first chain in engagement with said first ring gear and a second chain in engagement with said second ring gear.

7. The system as recited in claim 6, further comprising an upper gear set in meshing engagement with said upper chain, a lower gear set in meshing engagement with said lower chain and an idler gear set therebetween.

8. The system as recited in claim 6, further comprising:
a first shaft rotatable about a first axis of rotation displaced from said rotor axis of rotation;
a first driven gear mounted to said first shaft, said first driven gear in meshing engagement with said first chain;
a first idler gear mounted to said first shaft;
a first sprocket arm;
a first idler sprocket mounted to said first sprocket arm, said first idler sprocket in meshing engagement with said second chain, said first idler sprocket rotatable about a first sprocket axis displaced from said first axis;
a second shaft rotatable about a second axis of rotation;
a second driven gear mounted to said second shaft, said second driven gear in meshing engagement with said second chain;
a second idler gear mounted to said second shaft, said second idler gear in meshing engagement with said first idler gear;
a second sprocket arm;
a second idler sprocket mounted to said second sprocket arm, said second idler sprocket in meshing engagement with said first chain, said second idler sprocket rotatable about a second sprocket axis displaced from said second axis.

9. The system as recited in claim 7, further comprising a clutch system mounted to said first shaft to selectively disengage said gear set to permit said shaft fairing to rotate freely about said axis of rotation.

10. The system as recited in claim 1, wherein said gear set further comprising an upper gear set in meshing engagement with said first ring gear, a lower gear set in meshing engagement with said second ring gear and an idler gear set therebetween.

11. The system as recited in claim 1, wherein said gear set comprises a first driven gear in engagement with said first ring gear and a second driven gear in engagement with said second ring gear.

12. The system as recited in claim 11, wherein said first driven gear and said second driven gear cooperate through an idler gear set.

13. The system as recited in claim 12, wherein said idler gear set include a multitude of gears on a first shaft rotatable about a first shaft axis and a multiple of gears on a second shaft rotatable about a second shaft axis, said first shaft axis parallel to said second shaft axis.

14. The system as recited in claim 12, wherein said idler gear set include a multitude of gears on a first shaft and a multiple of gears on a second shaft, said first shaft driven by said first driven gear and said second shaft driven by said second driven gear.

15. A counter-rotating coaxial rotor system comprising:
a lower rotor hub mounted to a lower rotor shaft which rotates about a rotor axis of rotation;
an upper rotor hub mounted to an upper rotor shaft which rotates about said rotor axis of rotation in a direction counter to said rotation of said lower rotor shaft, said upper rotor shaft mounted at least partially through said lower rotor shaft;
an upper hub fairing mounted at least partially about said upper rotor hub;
a lower hub fairing mounted at least partially about said lower rotor hub;
a shaft fairing mounted between said upper hub fairing and said lower hub fairing for rotation about said rotor axis of rotation;
a first ring gear defined about said rotor axis of rotation, said first ring gear mounted for rotation with said upper rotor shaft;
a second ring gear defined about said rotor axis of rotation, said first ring gear mounted for rotation with said lower rotor shaft;
a gear set in meshing engagement with said first ring gear and said second ring gear; and
a housing mounted to said shaft fairing to support said gear set, said gear set operable to control a position of said shaft fairing about said axis of rotation.

16. The system as recited in claim 15, wherein said gear set comprises a first pinion in meshing engagement with an inner diameter of said first ring gear and a second pinion in meshing engagement with an outer diameter of said second ring gear, said first pinion gear rotationally mounted to said second pinion gear through a pinion shaft.

17. The system as recited in claim 15, further comprising:
a first chain in engagement with said first ring gear;
a second chain in engagement with said second ring gear;
a first shaft rotatable about a first axis of rotation;
a first driven gear mounted to said first shaft, said first driven gear in meshing engagement with said first chain;
a first idler gear mounted to said first shaft;
a first sprocket arm;
a first idler sprocket mounted to said first sprocket arm, said first idler sprocket in meshing engagement with said second chain, said first idler sprocket rotatable about a first sprocket axis displaced from said first axis;
a second shaft rotatable about a second axis of rotation;
a second driven gear mounted to said second shaft said second driven gear in meshing engagement with said second chain;
a second idler gear mounted to said second shaft, said second idler gear in meshing engagement with said first idler gear;
a second sprocket arm;
a second idler sprocket mounted to said second sprocket arm, said second idler sprocket in meshing engagement with said first chain, said second idler sprocket rotatable about a second sprocket axis displaced from said second axis.

18. The system as recited in claim 15, wherein said gear set further comprises:

a first shaft rotatable about a first axis of rotation;

a first driven gear mounted to said first shaft, said first driven gear in meshing engagement with said first ring gear;

a first idler gear mounted to said first shaft;

a second shaft rotatable about a second axis of rotation;

a second driven gear mounted to said second shaft, said second driven gear in meshing engagement with said second ring gear;

a second idler gear mounted to said second shaft, said second idler gear in meshing engagement with said first idler gear.

19. An aircraft having a counter-rotating coaxial rotor system comprising:

a lower rotor hub mounted to a lower rotor shaft which rotates about a rotor axis of rotation;

an upper rotor hub mounted to an upper rotor shaft which rotates about said rotor axis of rotation in a direction counter to said rotation of said lower rotor shaft, said upper rotor shaft mounted at least partially through said lower rotor shaft;

an upper hub fairing mounted at least partially about said upper rotor hub;

a lower hub fairing mounted at least partially about said lower rotor hub;

a shaft fairing mounted between said upper hub fairing and said lower hub fairing for rotation about said rotor axis of rotation;

a first ring gear defined about said rotor axis of rotation, said first ring gear mounted for rotation with said upper rotor shaft;

a second ring gear defined about said rotor axis of rotation, said first ring gear mounted for rotation with said lower rotor shaft;

a gear set in meshing engagement with said first ring gear and said second ring gear; and a housing mounted to said shaft fairing to support said gear set, said gear set operable to control a position of said shaft fairing about said axis of rotation.

20. The aircraft as recited in claim 19, wherein said aircraft is a rotary-wing aircraft with a translational thrust system.

* * * * *